Aug. 28, 1956  L. H. JONSSON  2,760,530
SAWBLADES
Filed Nov. 8, 1952
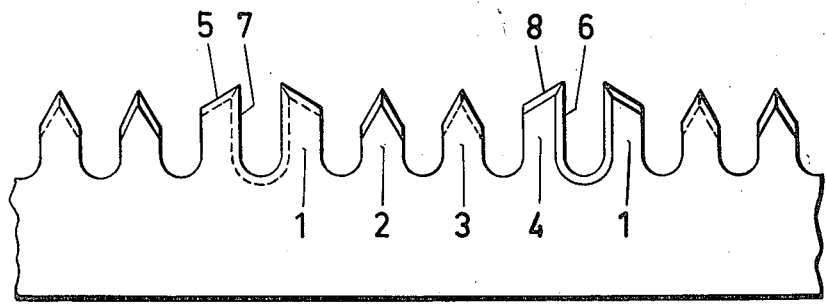

United States Patent Office 2,760,530
Patented Aug. 28, 1956

2,760,530

SAWBLADES

Lars H. Jonsson, Ovanaker, Sweden

Application November 8, 1952, Serial No. 319,585

2 Claims. (Cl. 143—133)

The present invention relates to a saw blade with consecutive groups of teeth there being four teeth provided with cutting edges in each group. The invention is characterized in that each group is limited by cutting edges at a right angle to the longitudinal direction of the saw blade and in that the outer teeth of each group have cutting edges running from the group limits obliquely downwards towards the middle of the group, said cutting edges having less inclination in relation to the back of the saw blade than the cutting edges of the inner teeth, and in that two outer teeth located beside each other are filed and set from the same side of the saw blade, the angular cutting edges facing each other.

An embodiment of the invention is shown in the accompanying drawing, according to which a group of two cutting teeth 1 and 4 alternates with a group of dust grinding teeth 2 and 3. The tooth bottom between the cutting teeth 1 and 4 is bevelled which contributes to the fact that the dust is more easily removed. The bevels of the grinding teeth 2 and 3 only extend some distance downwards along the tooth edge, whereby the base of said teeth become stable, which contributes to counteracting jarring during the sawing.

It has appeared that the effect and the durability of the sharpness of the cutting edges 7 and 8 are greatly improved when the cutting teeth 1 and 4 of each group face each other and when they are filed and set from the same side of the saw blade in such a manner that the edges 7 and 8 prevent the points of the angular cutting edges 5 and 6 from scraping against uncut wood and from driving together dust in one place.

The intermediate teeth 2 and 3 guide dust inwards to the middle of the kerf from both sides, and dust is removed from the kerf to the effect that the saw blade does not drive sawdust, which jam, together at certain points. By this combination a saw blade is obtained which runs practically as well in dry as in moist wood, in soft as in hard wood or in knotty wood as in wood without knots.

The back of the saw blade is preferably hollow-ground and if it is sufficiently hollow-ground, no setting is necessary when sawing dry wood.

Having now described my invention, what I claim as new and desire to secure by Letters Patent is:

1. A sawblade comprising successive groups of four teeth provided with cutting edges in each group, two outer teeth in each group being provided with saw tooth edges perpendicular to the longitudinal direction of the sawblade and with edges extending obliquely downwards towards the middle of the group, the adjacent teeth of adjacent groups having their substantially perpendicular cutting edges facing one another and filed and set from the same side of the sawblade, the cutting edges of the outer teeth of a group which extend obliquely downwards towards the middle of the group, being less obliquely inclined towards the back of the saw than any of the cutting edges of the inner teeth, the outer teeth of a group being wholly filed and set from opposite sides of the saw blade, the sequential teeth of each set being filed in opposite directions.

2. A sawblade as claimed in claim 1 wherein each inner tooth comprises a perpendicular base section and a second section supported thereby, the cutting edges being restricted to the second section, adjacent base sections defining a U-shaped notch.

References Cited in the file of this patent

UNITED STATES PATENTS

| 73,226 | Boynton | Jan. 14, 1868 |
| 112,569 | Emerson | Mar. 14, 1871 |
| 305,206 | Lowe | Sept. 16, 1884 |
| 308,549 | Boynton et al. | Nov. 25, 1884 |
| 599,329 | Guedel | Feb. 22, 1898 |
| 2,072,624 | Owen | Mar. 2, 1937 |
| 2,304,693 | Johnson | Dec. 8, 1942 |
| 2,351,737 | Blum | June 20, 1944 |

FOREIGN PATENTS

| 550,320 | Great Britain | Jan. 4, 1943 |